July 12, 1927.  A. LINNEBACH  1,635,795
METHOD OF AND APPARATUS FOR PROJECTING IMAGES
Filed June 8, 1922  2 Sheets-Sheet 1

Inventor
Adolph Linnebach
By his Attorneys
Cooper, Kerr & Dunham

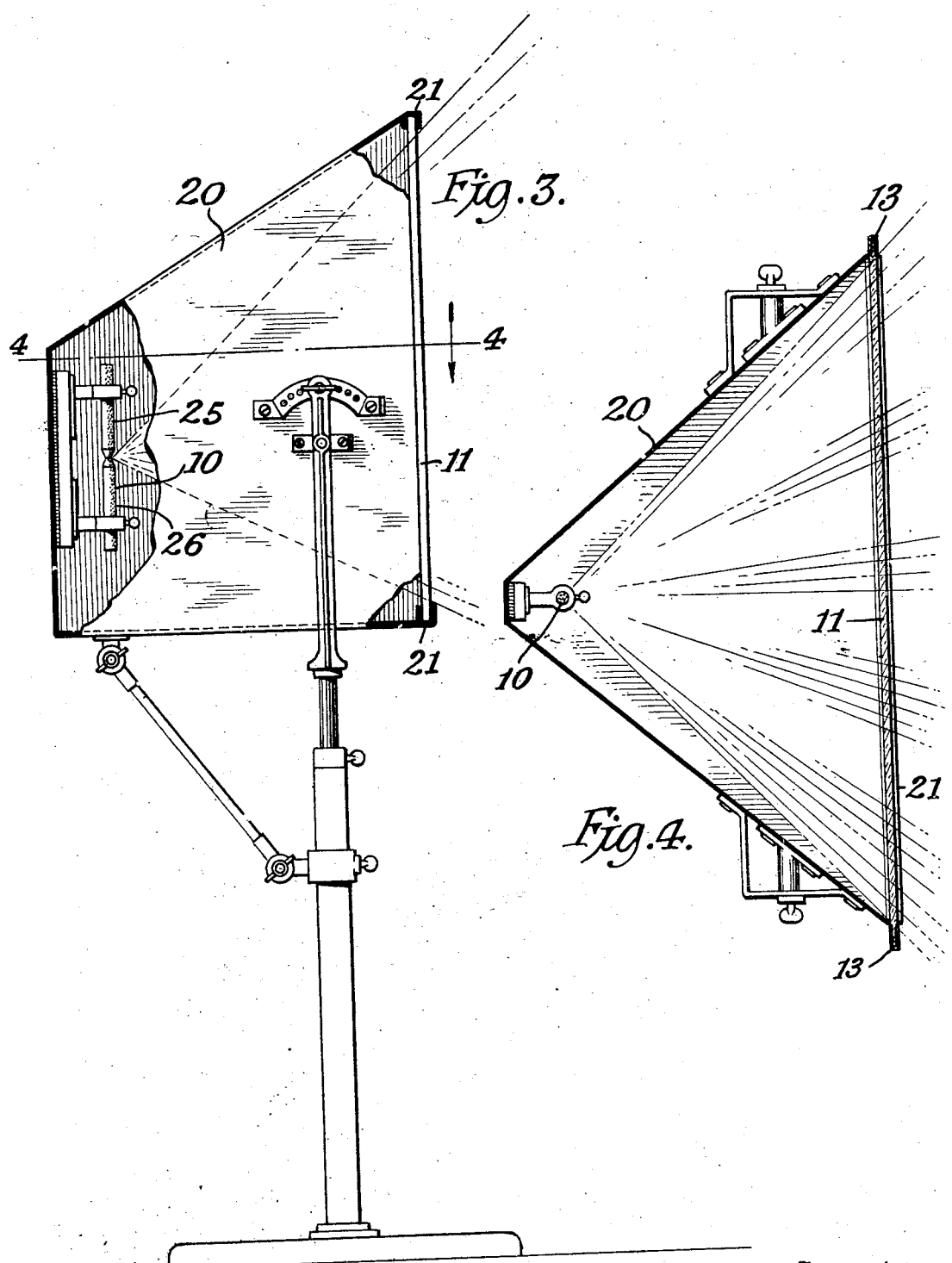

Patented July 12, 1927.

1,635,795

UNITED STATES PATENT OFFICE.

ADOLPH LINNEBACH, OF DRESDEN, GERMANY, ASSIGNOR TO JOHN H. KLIEGL AND ANTON T. KLIEGL, COPARTNERS, DOING BUSINESS AS UNIVERSAL ELECTRIC STAGE LIGHTING COMPANY, OF NEW YORK, N. Y.

METHOD OF AND APPARATUS FOR PROJECTING IMAGES.

Application filed June 8, 1922. Serial No. 566,747.

This invention relates to a method of and apparatus for forming backgrounds for use in theatres or other amusement houses and has for one of its more important objects to provide an improved method and apparatus whereby artistic and pleasing background effects may be obtained.

Another object is to provide a method and apparatus in which an undistorted image of an object is displayed upon a screen without the use of any lenses.

A further object is to provide a method and apparatus of the type referred to above in which the source of light may be placed comparatively close to the screen and yet produce artistic, undistorted images. Other objects and advantages will appear as the invention is hereinafter disclosed.

Referring to the drawings which illustrate what I now consider a preferred form of apparatus for carrying the method into practice:

Fig. 3 is an elevation, partly in section of one form of lamp housing and object holder.

Fig. 4 is a section on the line 4—4 of Fig. 3.

It has been proposed to project images upon a screen to produce a background effect. If a stereopticon or other projector comprising lenses be employed for this purpose, such projector must be placed at a distance from the screen practically equal to or greater than the greater dimension of the projected image and in no case could such distance be less than that which would cause a field of projection greater than 60°, lest the image appear distorted and otherwise objectionable. I have devised a method and means whereby the apparatus employed may be located within a comparatively short distance from the screen and yet produce highly artistic, clear and undistorted images of an object upon a screen. And I achieve this result by virtue of extremely simple apparatus, as will hereinafter appear.

Figure 1:
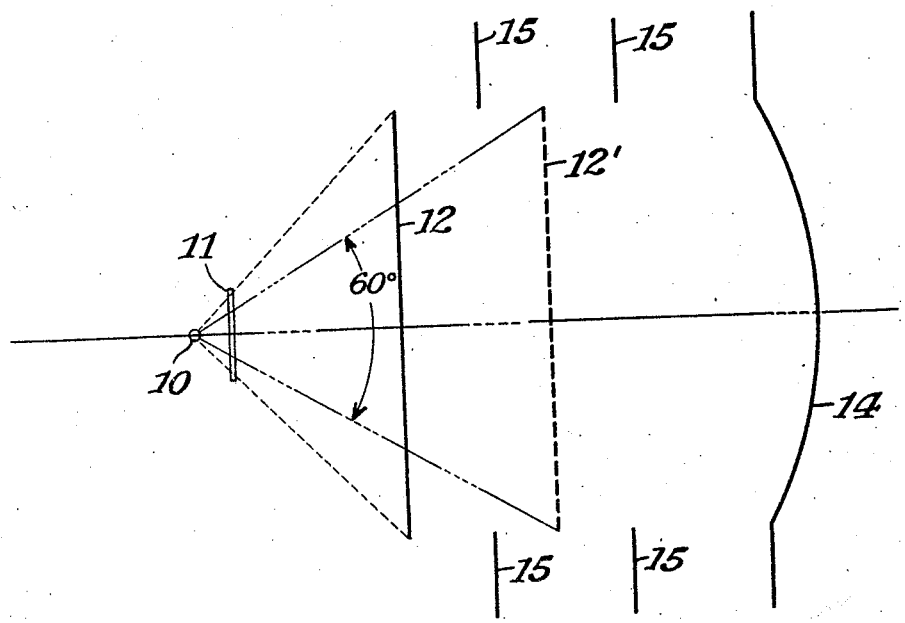
Fig. 1 is a diagrammatic plan view illustrating the invention employed in connection with the stage of a theatre.
Figure 2:
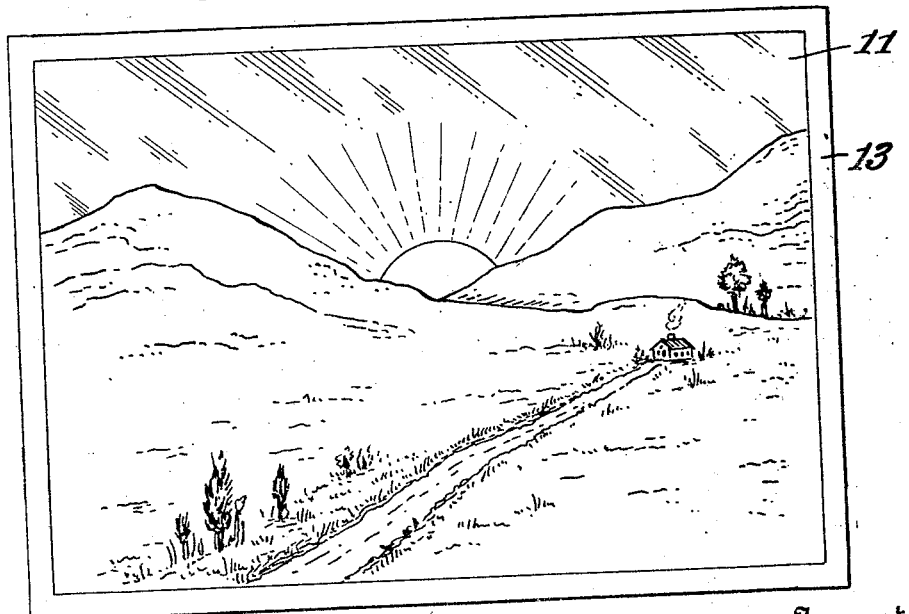
Fig. 2 is a front elevation of an object or slide employed.

As shown in Fig. 1, my invention embodies a high intensity source of light 10, an object 11 and a screen 12. The source of light may assume the form of an arc lamp of suitable intensity or a high intensity incandescent lamp such as those now commonly employed in connection with stereopticons and other projectors. The object 11 consists of a pane or sheet of glass or other suitable transparent or translucent material upon which a scene or other representation is depicted; by means of opaque pigments or other materials, or translucent pigments or dyes or other materials of a suitable color or colors, or a combination of any of these. Such an object is shown in Fig. 2, the glass 11 being preferably provided with a frame 13 of wood or other suitable material for a purpose which will presently appear. The screen 12 is preferably of such material as will permit the images projected thereon to the visible from the side of the screen opposite that upon which the apparatus 10, 11 is located, yet conceal the last mentioned apparatus from the audience. An example of such material is varnished linen.

In Fig. 1 I have indicated the stage of a theatre, comprising the apron 14, wings 15 and the screen 12 here employed as a back drop. Assuming that the screen shown is about thirty feet wide, the total available depth between the apparatus 10, 11 and the apron 14 would be about forty-five feet, these being the relative proportions of the ordinary stage. Now, if projecting apparatus were located on the front or audience side of the screen 12, the actors in action upon the stage and in front of the screen would cast shadows upon the latter and spoil the whole background effect. On the other hand any attempt to employ a projector, embodying lenses, behind the screen 12 would mean that the screen 12 would have to be moved forwardly at least as far as the position shown in dotted lines at 12', lest distortion of the projected image or images result. Under these conditions the available stage-depth between the apron 14 and screen would be insufficient for the action to proceed satisfactorily. And this though specially designed lenses be employed in the projector.

By virtue of my invention the apparatus 10, 11 and screen 12 may be placed comparatively close together and yet the image or images upon the screen will appear distinct, undistorted and highly pleasing and natural in appearance. Indeed, I have obtained highly satisfactory results in the production of clear, artistic, undistorted images upon a screen where the distance between the screen 12 and light source 10 was no more than one-half the greater dimension (usually width) of the screen. In other words, if the total available distance between the light 10 and apron 14 is 45 feet and the width of the screen 12 is 30 feet, the screen 12 need be placed only 15 feet (or even less) from the light 10, and yet undistorted and highly artistic images are produced upon the screen. This leaves a distance of 30 feet between the screen 12 and apron 14 so that the action may proceed satisfactorily upon the stage in front of the back drop 12.

My invention in its fundamentals necessitates the use of only the following apparatus: the light source 10, the screen 12 and the object or objects 11 located between the said elements 10 and 12. Lenses are entirely dispensed with and the apparatus is comparatively cheap to manufacture. Furthermore, instead of shifting scenes by substituting, for a back drop 12, a different back drop or back drops, one need only substitute a different object bearing the desired scene for that shown at 11. The objects 11 are comparatively small and inexpensive to produce and may be transported with greater facility and at a greatly reduced cost.

While the apparatus thus far described is operative to practice the novel method, I prefer to mount the light 10 in a housing, such housing having an object holder adapted to hold an object (such as that shown in Fig. 2) in the path of the light rays and into which or from which the object or objects may be readily inserted or removed. One form of such apparatus is shown in Figs. 3 et seq. and may be constructed substantially as follows:

A housing 20 of metal or other suitable material and comprising top, bottom, rear and side walls, is provided at its open front with channels or grooved members 21 adapted slidably to receive, one at a time, objects 11, 13. A source of light 10 is mounted in the housing. While this source of light 10 may assume the form of an incandescent lamp, I have selected for the purpose of illustration, the crater of the carbon or other electrode 25 of a D. C. arc lamp. The other carbon 26 of the lamp is suitably insulated from the carbon 25 and both are insulated, in the usual manner, from the housing 20 which supports them. Suitable mechanism for striking the arc and feeding the carbons is provided and obviously the carbons or electrodes may be replaced when consumed.

Direct current may be supplied to the electrodes from any suitable source. The housing 20 not only serves to exclude extraneous light from the side of the object toward the light but serves also to screen the high intensity light source from the operator's eyes. The housing 20 need not serve in any sense as a reflector or condenser. In fact, I prefer to coat the interior of the housing with a non-reflecting or light-absorbing substance such as dull black paint.

The dimensions of the housing 20 will depend upon the dimensions of the screen employed, the dimensions of the objects employed, and the distance between the light 10 and the screen. If the screen be wider than it is high, as is usually the case, and calling this width —W— and the height H, the following relative dimensions and distances will be found satisfactory.

The distance between light source 10 and screen 12 may be W/2; the width of the object W/10; the height of the object H/10; and the distance between light source 10 and the object (or plane of the object holder)— W/20. Such an apparatus will project clear, highly artistic, and undistorted images of objects 11 upon the screen 12. Obviously other relationships of dimensions may be employed and the apparatus otherwise modified without departing from the scope of the invention as defined in the following claims.

What I claim is:

1. The method of forming a background for the stage of an amusement house, which method consists in projecting a substantially undistorted image from a translucent object upon a screen, by projecting a cone of light having an apex angle of more than 60° upon the screen through the object; and substantially preventing the passage, to the side of said object remote from the screen, of rays of light other than those bounded by the cone.

2. A machine for projecting enlarged images of objects and comprising in combination, a housing, an object holder carried thereby, and a lamp-support carried by said housing and spaced from said object holder at a distance less than the greater dimension of said object holder, said housing being provided with means for substantially preventing rays of light, other than rays bounded by a cone having its base in the plane of said object holder and its apex adjacent said lamp support, from reaching the plane of said object holder.

3. The method of forming a background for the stage of an amusement house, which method consists in projecting a substantially undistorted magnified image from a translucent object upon a screen, by projecting a cone of light having an apex angle of more than 60° upon the screen through the object; and substantially preventing the passage, to the side of said object remote from the screen, of rays of light other than those bounded by the cone and passing through its apex portion.

4. A machine as set forth in claim 2 in which the lamp support is provided with a lamp from which the rays of light emanate to form the cone of light passing to the object holder and in which the last mentioned "means" comprise light-absorbing and non-reflecting surfaces.

In testimony whereof I hereto affix my signature.

ADOLPH LINNEBACH.